(12) United States Patent
Lorenzo et al.

(10) Patent No.: US 7,899,950 B2
(45) Date of Patent: Mar. 1, 2011

(54) SYSTEM AND METHOD FOR REMOTE COMMUNICATION WITH A MULTIFUNCTIONAL DEVICE

(75) Inventors: Arturo M. Lorenzo, Fairport, NY (US); Michael F. Cavanaugh, Webster, NY (US); Jeffrey M. Novak, Lake Oswego, OR (US); J. Roger Cortez, Lafayette, CA (US); Charles M. Surowiec, Jr., Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1023 days.

(21) Appl. No.: 11/716,801

(22) Filed: Mar. 12, 2007

(65) Prior Publication Data

US 2008/0228956 A1    Sep. 18, 2008

(51) Int. Cl.
*G06F 3/00* (2006.01)

(52) U.S. Cl. .......................................... 710/18; 705/1.1

(58) Field of Classification Search ....................... 710/18
See application file for complete search history.

(56) References Cited

U.S. PATENT DOCUMENTS

| | | | |
|---|---|---|---|
| 4,496,237 A | 1/1985 | Schron | |
| 4,497,037 A | 1/1985 | Kato et al. | |
| 5,038,319 A | 8/1991 | Carter et al. | |
| 5,077,582 A | 12/1991 | Kravette et al. | |
| 5,305,055 A | 4/1994 | Ebner et al. | |
| 5,305,199 A | 4/1994 | LoBiondo et al. | |
| 5,638,427 A * | 6/1997 | Flemming et al. | 379/93.17 |
| 6,023,593 A * | 2/2000 | Tomidokoro | 399/8 |
| 6,985,877 B1 | 1/2006 | Hayward et al. | |
| 7,518,750 B2 * | 4/2009 | Wright | 358/1.9 |
| 7,664,886 B2 * | 2/2010 | Motoyama et al. | 710/8 |
| 2004/0005914 A1 * | 1/2004 | Dear | 455/563 |
| 2004/0193675 A1 * | 9/2004 | Fillebrown et al. | 709/203 |
| 2005/0254850 A1 | 11/2005 | Bardolatzy et al. | |
| 2006/0180664 A1 * | 8/2006 | Barrett et al. | 235/383 |
| 2006/0276131 A1 * | 12/2006 | Rambo | 455/41.2 |

* cited by examiner

*Primary Examiner* — Henry W Tsai
*Assistant Examiner* — Elias Mamo
(74) *Attorney, Agent, or Firm* — Philip E. Blair; Fleit Gibbons Gutman Bongini & Bianco P.L.

(57) ABSTRACT

Systems and methods for transmitting information from a multifunctional device to a centralized management server are disclosed. A method for transmitting information between a multifunctional device and a centralized management server includes collecting information from a multifunctional device using a wireless device; rendering the information secure using a secure functionality; and transmitting the secure information over a network to a centralized management server.

21 Claims, 7 Drawing Sheets

SYSTEM AND METHOD FOR REMOTE COMMUNICATION WITH A MULTIFUNCTIONAL DEVICE

The embodiments disclosed herein relate to remote communication with a multifunctional device, and more particularly to a system and method for collecting information from a multifunctional device, such as a printer or digital copier, using a wireless device. The wireless device is able to store the collected information, transmit the collected information to a centralized management server, and receive feedback from the centralized management server.

BACKGROUND

Systems and methods for remotely monitoring a multifunctional device in order to collect information from the device, such as billing information and ongoing failure information are known in the art. For example, a basic system is a series of indicators arranged remotely as a "scoreboard" to show the status of each multifunctional device in a limited fashion. This approach is only able to indicate gross failures and is not a practical monitoring system for a large number of multifunctional devices distributed over a large area or on multiple floors of a building.

A technique for remotely monitoring a number of multifunctional devices is the Xerox Remote Interactive Communications (RIC) system which interfaces with several different Xerox copiers and relays status information over telephone lines to a central service office. The RIC adapter consists of a dedicated microprocessor controller that plugs into a special data port on the multifunctional device and an auto-dial modem for direct hookup to a telephone line. This approach relies on a dedicated telephone line for each multifunctional device. With the plethora of devices existing in many different geographical locations, setting up and managing the devices is complicated and expensive as each device needs to have phone service established with a specific telephone company, a telephone technician dispatched to cable and install a phone jack and the expense of a full dedicated business phone line must be contracted. These and other various systems and methods for remotely monitoring multifunctional devices are described in U.S. Pat. No. 4,497,037 entitled "Apparatus for Monitoring a Group of Copying Machines," U.S. Pat. No. 5,038,319 entitled "System for Recording and Remotely Accessing Operating Data in a Reproduction Machine," and U.S. Pat. No. 5,077,582 entitled "Photocopy Monitoring System," all of which are incorporated by reference in their entireties for the teachings therein.

Thus, there is a need in the art for systems and methods for remotely monitoring a large number of multifunctional devices based on a wireless device that does not require special site preparation, does not require a dedicated telephone line and minimizes overall communications costs. In addition, there is a need to be able to track multifunctional devices to their physical location, which may change as the user's needs for multifunction devices change, in order to provide service to the devices and assure the proper billings are processed.

U.S. Pat. Nos. 4,496,237 and 5,305,055 are examples of "Remote Interactive Communication" with a large copier through a commercial phone line. U.S. Pat. No. 5,305,199 teaches how remote communication, such as through a network, can be used to initiate the ordering of supplies for a machine when a supply within a machine is approaching a spent state.

The present disclosure describes use of commercially-available text-messaging resources for communication of operating information. US Published Patent Application 2005/0254850 teaches the use of "text messaging" in an office-equipment context.

SUMMARY

Systems and methods for remote communication with a multifunctional device are disclosed herein. The systems and methods for remote communication with a multifunctional device uses a wireless device that is able to collect, store and transmit the information to a centralized management server without accessing a network, such as the Internet, or an intranet, at the multifunctional device location. The wireless device uses a wireless network for secure transmission of information to a remote location and is also capable of keeping track of the location of the multifunctional device across many different geographic areas. Therefore, a single efficient, timely system and method for collecting information across multiple multifunctional device platforms and diverse customer network topologies, independent of multifunctional device configuration is provided.

According to aspects illustrated herein, there is provided a system for collecting information from a multifunctional device that includes a multifunctional device; and a wireless device in operative communication with the multifunctional device, wherein the wireless device collects information from the multifunctional device.

According to aspects illustrated herein, there is provided a system for transmitting information from a multifunctional device to a centralized management server that includes a multifunctional device; a wireless device in operative communication with the multifunctional device; a network in operative communication with the wireless device, wherein the wireless device can transmit information securely over the network; a communications controller in operative communication with the network; and a centralized management server in operative communication with the communications controller.

According to aspects illustrated herein, there is provided a method of transmitting information from a multifunctional device to a centralized management server that includes collecting information from a multifunctional device using a wireless device; rendering the information secure using a secure functionality; and transmitting the secure information over a network to a centralized management server.

BRIEF DESCRIPTION OF THE DRAWINGS

The presently disclosed embodiments will be further explained with reference to the attached drawings, wherein like structures are referred to by like numerals throughout the several views. The drawings are not necessarily to scale, the emphasis having instead been generally placed upon illustrating the principles of the presently disclosed embodiments.

Figure 1:
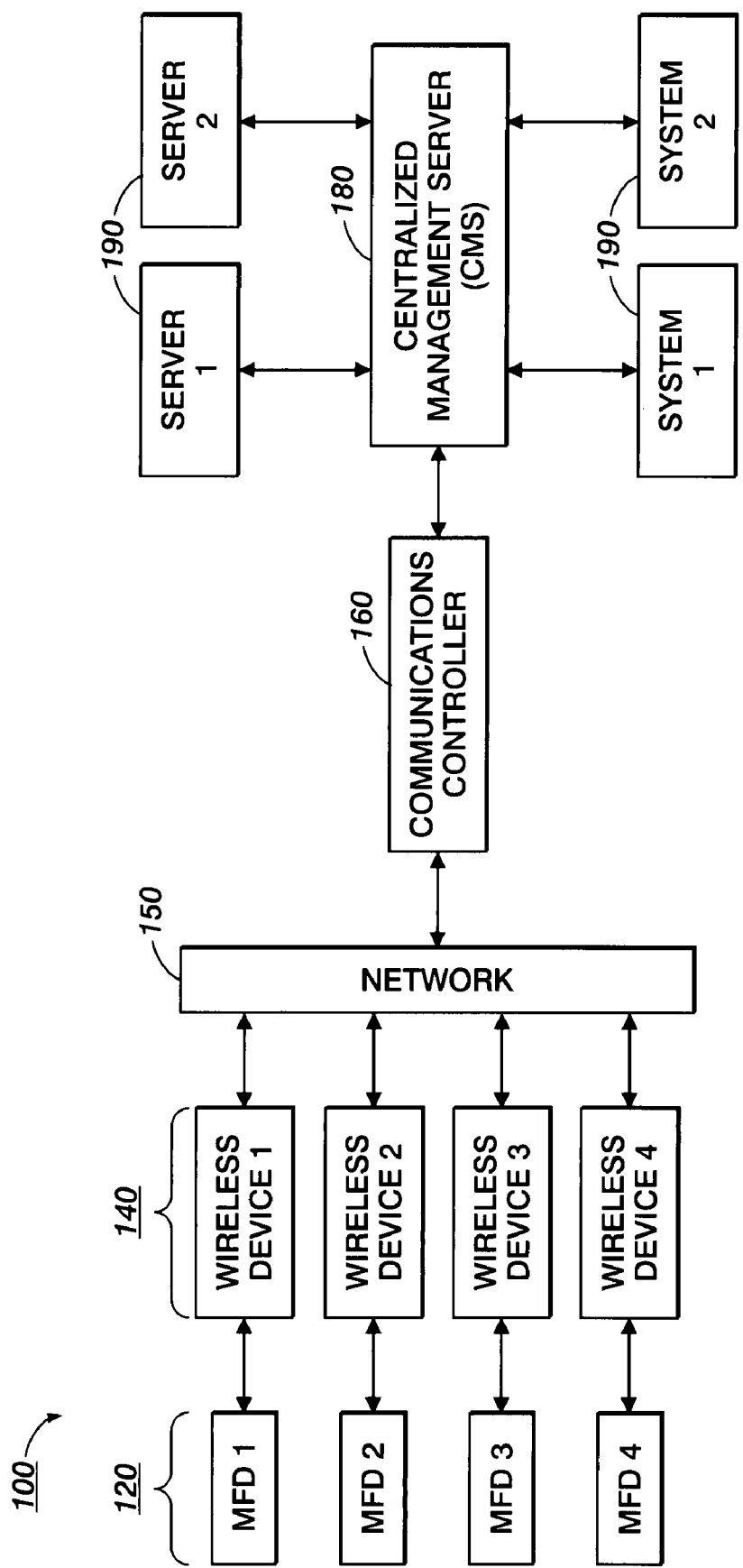
FIG. 1 is a schematic block diagram showing the main components of a system for remote communication with a multifunctional device.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Systems and methods for remotely collecting information from a multifunctional device are disclosed. The presently disclosed embodiments permit the collection of information from a multifunctional device in a simple process without imposing any difficulties on a user of the multifunctional device. In the method of transmitting information from a multifunctional device to a centralized management server, information is collected from the multifunctional device using a wireless device; the information is rendered secure using a security functionality module in the wireless device; and the secure information is transmitted over a wireless network to the centralized management server. The wireless device uses a wireless network for secure transmission of information to a remote location and is also capable of keeping track of the location of the multifunctional device across many different geographic areas.

Multifunctional devices (MFDs) disclosed herein include both those that are "connected" and those that are "unconnected." An "unconnected" MFD does not have access to a network (for example, the Internet). In an embodiment, the unconnected MFD is a stand-alone copier. A "connected" MFD is normally connected via an Ethernet card or the like to a network. In an embodiment, the MFD is an unconnected MFD that is in operative communication with a wireless device, the wireless device being able to access a network. A connection between the multifunctional device and the wireless device is made through a two-way communication channel located on the multifunctional device.

Wireless devices (WDs) disclosed herein have connectivity to a wireless network such as the Global Systems for Mobile Communication/General Packet Radio Service (GSM/GPRS) network or the Integrated Dispatch Enhance Network (iDEN) or similar systems or networks. The WD also includes an amount of persistent data storage, an Open Source technology (for example, Java Technology), wireless programming capabilities (for example, Java 2 Micro Edition (J2ME) programmable microprocessor) and a security functionality (for example, HyperText Transport Protocol Secure (HTTPS)) for transmitting information to a centralized management server securely. The WD may also contain a Global Positioning System (GPS) to monitor the location of the multifunctional device. This feature makes collecting information more efficient, especially when a multifunctional device has been moved from one location to another; an individual needing the information can easily collect the information without having the difficulty of first finding the device.

In FIG. 1, a system 100 for remotely collecting and transmitting information from a multifunctional device (MFD) 120 includes a number of components which will be discussed below. As used herein, a multifunctional device or MFD can be any device used for the collection, transmission, printing, faxing, and/or storage of document data. A wireless device 140 collects, stores, and transmits information from a multifunctional device 120 to a centralized management server (CMS) 180, and vice-versa, using a wireless secured data transmission protocol directly to a network 150 (for example, the Internet). A communication controller 160 communicates the information from the network 150 to the centralized management server 180. The communication controller 160 communicates with the network 150 and acts as an initiator or collector of information from the MFD 120 according to the network identity of the MFD 120 (for example, the IP address of the MFD 120). The communication controller 160 may be used to connect to multiple networks 150 or, act as a "transmitter/receiver" device. The communication controller 160 may have standalone functionality or may be integrated within the CMS 180. The centralized management server 180 may include a number of additional servers and systems depicted generally at 190 including, but not limited to, a billing server, a local website server, a persistence database, a service system, and a local account team system. Those skilled in the art will recognize that the system 100 may collect information from a number of multifunctional devices 120 (for example, MFD 1, MFD 2, MFD 3, and MFD 4) using a number of wireless devices (for example, respectively, wireless device 1, wireless device 2, wireless device 3, and wireless device 4) and be within the scope and spirit of the presently disclosed embodiments.

The multifunctional device 120 may include one or more of the following devices: a copier, a xerographic system, an electrostatographic machine or similar devices. The MFD 120 may include a facsimile function, a printer function, a copy function, a scanner function, a phone answering function, or other similar functions. Alternately, a plurality of devices, including at least one of the above functions, may be operatively interconnected by cable or by radio waves to constitute a MFD 120. "Wireless Device" as used herein includes cellular telephones, personal digital assistants (PDAs), personal or portable computers, two-way pagers or similar devices, as well as specialized integrated circuits or programmable logical devices that are integrated at the bus level within the MFD 120.

"Information" (also referred to as "data") as used herein refers to information including, but not limited to, device serial number; operational data, including device data; error codes and data; service codes and data; the number of paper jams; the amount of toner available; the amount of supplies available; fault information; crash data; billing meter counts; individual user identification and pricing for billing individual users of the MFD (for example, Auditron functionality) and similar information. The information collected from the multifunctional device 120 and collected on the wireless device 140, is rendered secure for transmission using a communication protocol such as Hypertext Transfer Protocol over Secure Socket Layer (HTTPS) or similarly security systems.

Figure 2:
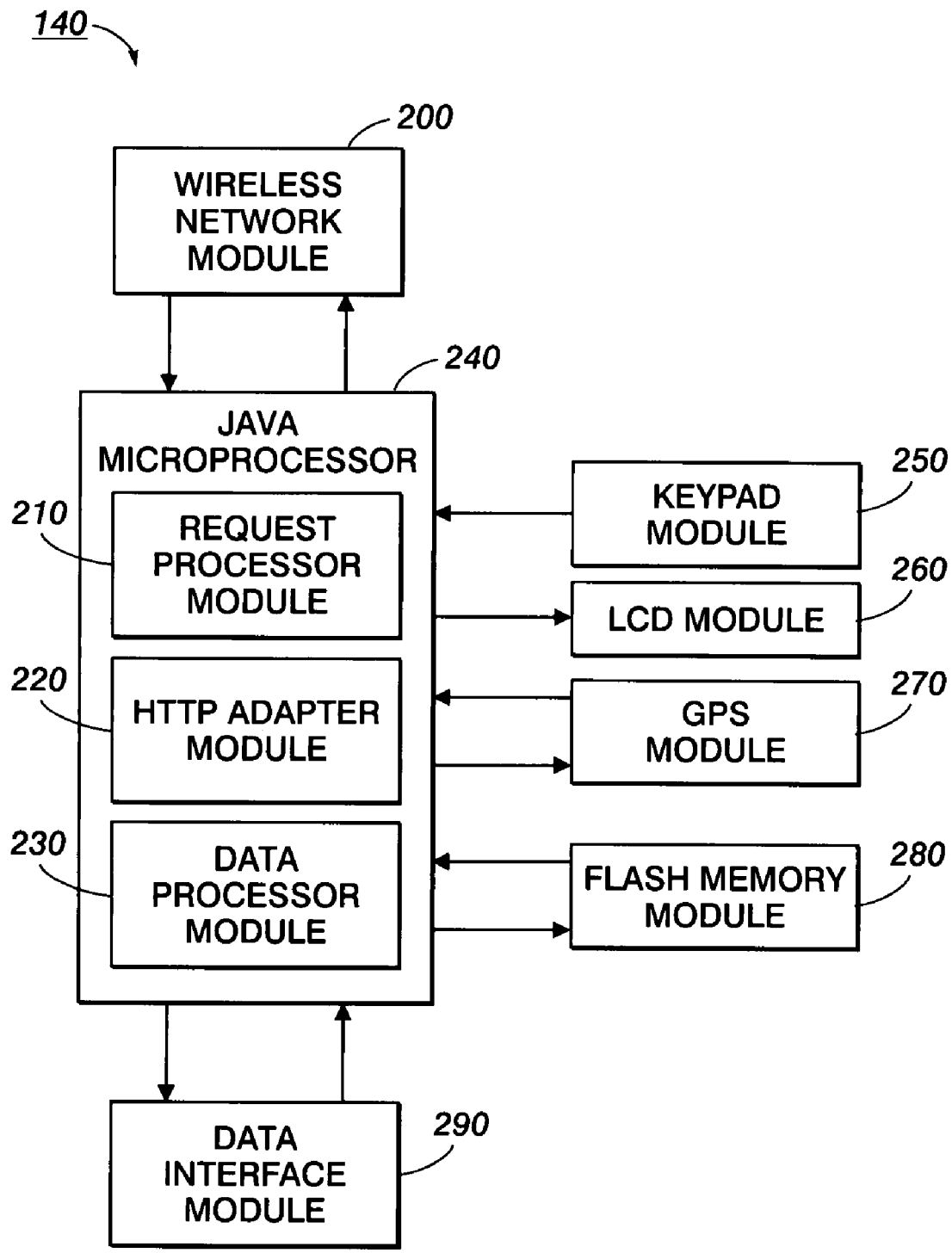
FIG. 2 is a schematic block diagram showing the main modules of a wireless device.

FIG. 2 illustrates a schematic diagram of the wireless device 140. The wireless device 140 receives requests for information from the centralized management server 180 and sends responses from the multifunctional device 120 using several different modules which will be discussed below. The wireless device 140 uses a wireless network module 200 (for example, a GSM/GPRS module) to receive requests and send responses over-the-air. A Java microprocessor 240 is driven by a J2ME standard toolkit. The Java microprocessor 240 comprises three modules, a request processor module 210; a HTTP adapter module 220; and a data processor module 230. HTTP formatted messages that comprise information are processed by application code on the Java microprocessor 240. The application code stores and retrieves configuration information in a flash memory module 280. Application code in the Java microprocessor 240 interacts with the multifunctional device 120 through a data interface module 290. A user or installer may be capable of inputting requests or configuration information using a keypad module 250. Status information may be displayed on a LCD module 260. The location of the wireless device 140, and hence the multifunctional device 120 associated with the wireless device 140, may be determined at any time using a GPS module 270 which collects GPS data on the wireless device 140.

The data interface module 290 may include any data port that is capable of extracting information from the multifunctional device 120 in response to requests or by a predetermined algorithm and then sending the information to the centralized management server 180 via the wireless device 140. The data interface module 290 may include, but is not limited to, a RS-232 (EIA232) standard serial port, a Universal Serial Bus port (for example, USB1, USB2, and FireWire (IEEE 1394)) or similar ports, busses or devices, as well as other integrated, local area wireless interfaces, such as Bluetooth. Those skilled in the art will recognize that other data ports may be used and be within the scope and spirit of the presently disclosed embodiments.

Figure 3:
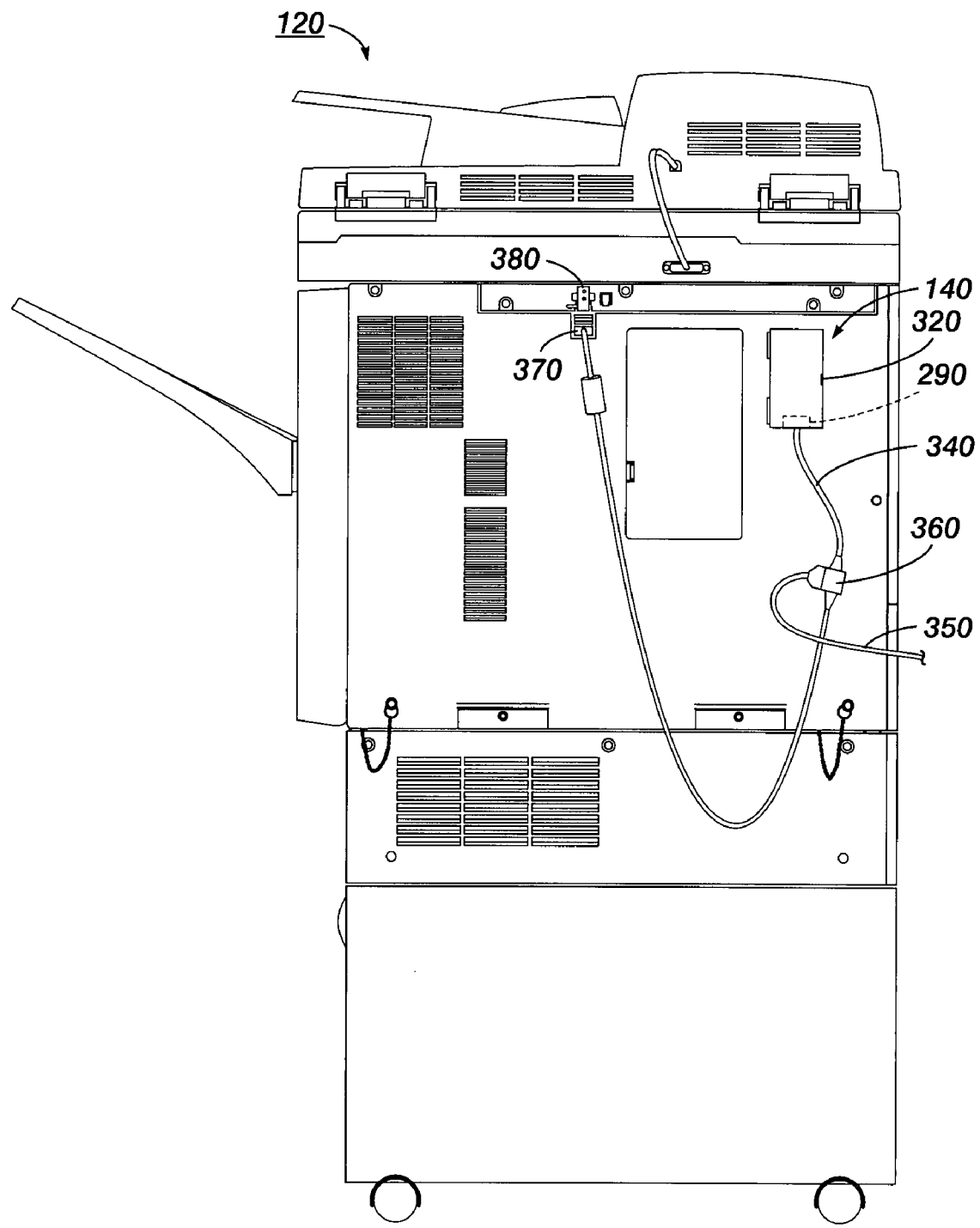
FIG. 3 illustrates a multifunctional device in operative communication with a wireless device.

FIG. 3 illustrates a multifunctional device 120 in communication with a wireless device 140 according to the presently disclosed embodiments. The wireless device 140 is attached to a two-way communication channel 380 of the multifunctional device 120 for the purpose of collecting, storing and communicating information to the centralized management server 180. In an embodiment, the wireless device 140 is encased in a unit enclosure 320 and attached to the multifunctional device 120 on the back-side, by any attachment means known in the art. For example, the wireless device 140 is encased in the unit enclosure 320 and attached via two-sided tape. In an embodiment, the wireless device 140 is integrated or attached within the MFD 120 enclosure, and utilizes available MFD 120 power supplies. A data cable 340 is attached to the data interface module 290 of wireless device 140. A charger cable 350 is connected at one end of the data cable 340 at a serial connector 360 and is connected at the other end to an AC outlet. A custom connector 370 at the end of the data cable 340 attaches to the two-way communication channel 380 of the multifunctional device 120. In an embodiment, the two-way communication channel 380 is a serial port. In an embodiment, the wireless device 140 is a cellular telephone. The wireless device 140 is not associated with a phone number and does not function as a normal phone, although this functionality may be an option.

Figure 4:
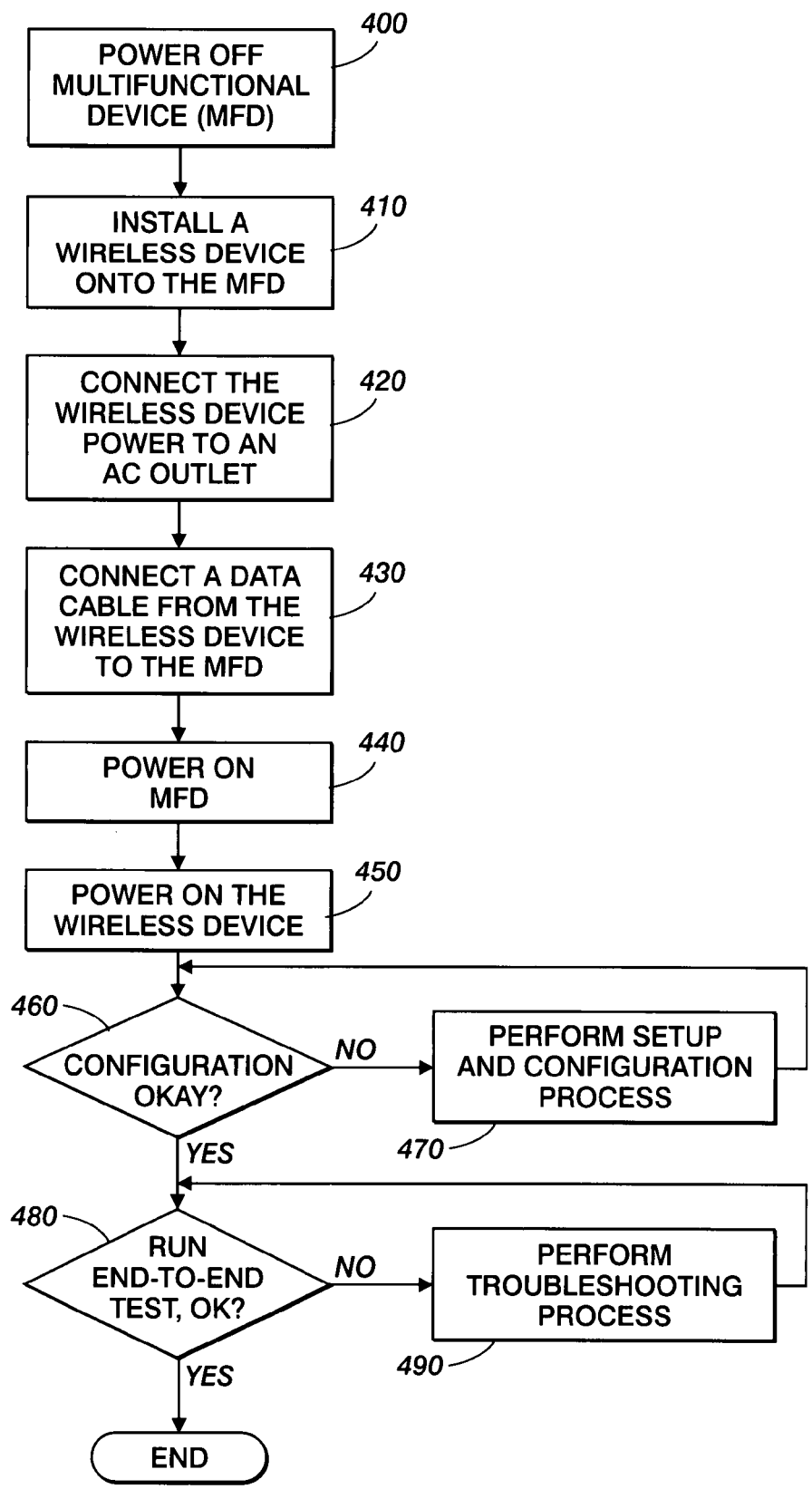
FIG. 4 is a flow diagram for the method of connecting a wireless device to a multifunctional device.

FIG. 4 is a flow diagram illustrating the steps of a method for connecting the wireless device 140 to the multifunctional device 120. In step 400, an individual installing the wireless device 140 powers off the multifunctional device 120. The installation of the wireless device 140 is accomplished based on an instructional guide. In practice, the wireless device 140 will likely be installed by the supplier of the MFD 120 or the company who will be collecting the information from the system 100. The wireless device 140 is installed on the multifunctional device 120 as shown in step 410. The individual then connects the wireless device 140 power to an AC power outlet as shown in step 420. The data cable 340 connection between the multifunctional device 120 and the wireless device 140 is via the two-way communication channel 380 as shown in step 430. The individual then powers on the multifunctional device 120 as shown in step 440, followed by the wireless device 140 as shown in step 450. The wireless device 140 and the multifunctional device 120 are typically associated with a serial number for tracking purposes.

The wireless device 140 may be pre-configured to include identifying information, including, but not limited to the serial number of the multifunctional device 120, the IP address of the multifunctional device 120, the date and/or version of the software installed on the wireless device 140, a "default" polling schema-time and date information should be collected from the multifunctional device 120, the number of retries if failed calls, and a customer account code or contract number. The individual installing the wireless device 140 will check to make sure that the pre-configured wireless device 140 is working correctly as shown in step 460. If the wireless device 140 is not configured correctly, the method continues to step 470 and the individual will perform a setup and configuration process. However, if the wireless device 140 is working correctly, the method continues to step 480 and an end-to-end test is run. If the end-to end test is satisfactory the method terminates. However, if the end-to-end test is not satisfactory, the individual will perform a troubleshooting process as shown in step 490. Step 470, step 480 and step 490 are repeated as necessary for the wireless device to have the correct configuration.

For purposes of the presently disclosed embodiments, the information to be extracted is a current billing meter count. Those skilled in the art will recognize that other types of information can be extracted from the multifunctional device 120 and still be within the scope and spirit of the presently disclosed embodiments. In the normal running state, the wireless device 140 is continually and automatically extracting the current billing meter count from the multifunctional device 120 and periodically posting status information to the centralized management server 180. The timing of the posting may be from default settings or programmable settings on the wireless device 140. The posting will likely be synched such that the CMS 180 is expecting the posting based on the settings on the wireless device 140. For example, it could post every $1000^{th}$ meter, post only at a specific time and/or date or post in response to internal directions from the MFD 120, for example, a service code. For example, in the normal running state, a spinner on the LCD module 260 will be active, indicating that the wireless device 140 is working properly. Once a user of the multifunctional device 120 is finished with a job, the meter count will be updated. The wireless device 140 communicates remotely and periodically transmits the meter count information to the centralized management server 180. In the case of providing a service code, the wireless device 140 can send the service code relating to a specific malfunction or other condition of the MFD 120, and receipt of the service code by the CMS 180 can be used to initiate a service call (in-person or virtual) for the particular MFD 120.

Figure 5:
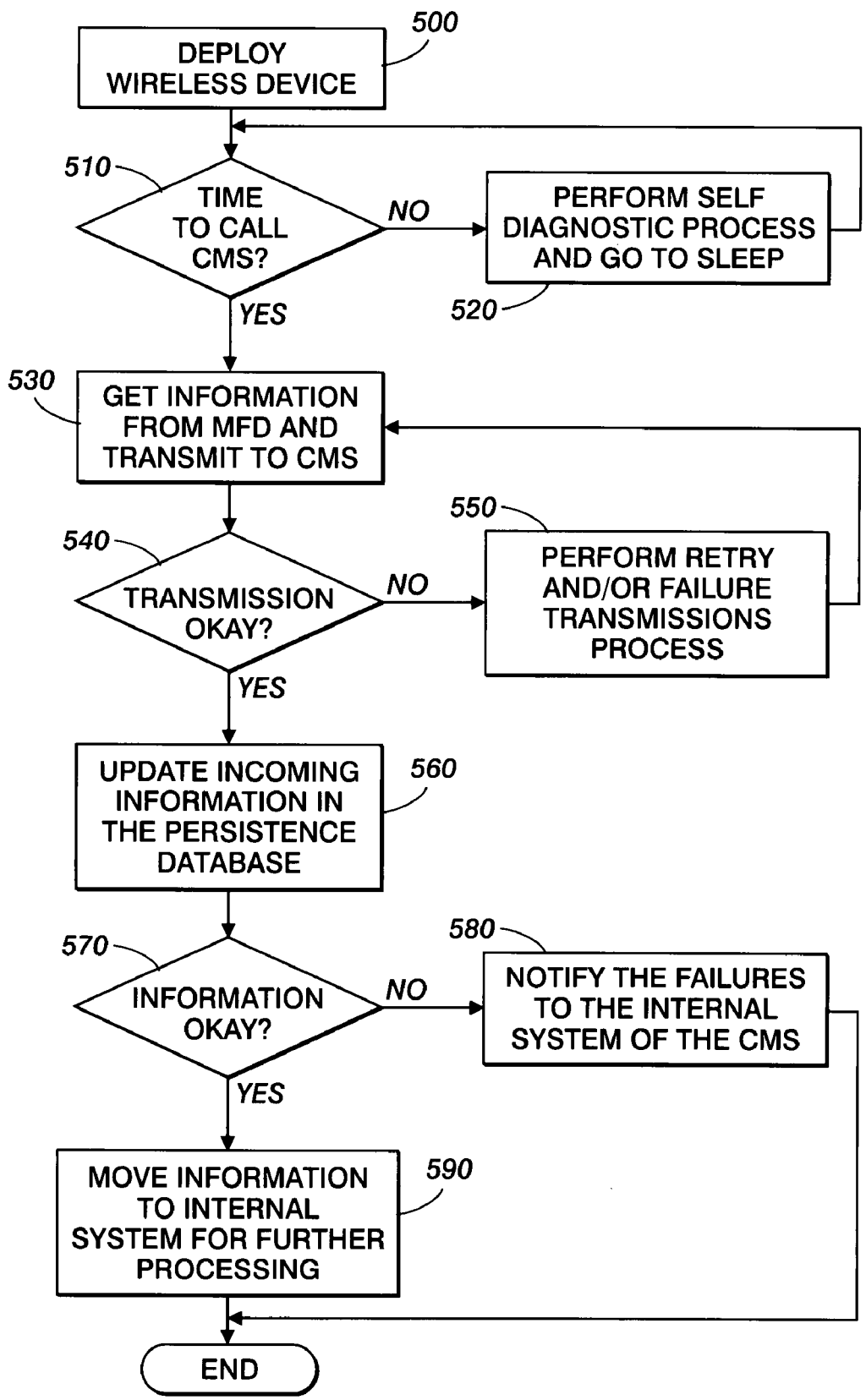
FIG. 5 is a flow diagram showing the general method steps of remotely obtaining information from a multifunctional device.

FIG. 5 is a flow diagram illustrating the steps of a method for remotely obtaining information from the multifunctional device 120. In step 500, the wireless device 140 is deployed. The wireless device 140 checks the configuration setup and determines whether it is time to call the centralized management server (CMS) 180 as shown in step 510. If the answer is no, the method continues to step 520 and the wireless device 140 performs a self-diagnostic process and will go to sleep. If the configuration setup determines that it is time to call the CMS 180, the method proceeds to step 530. At step 530, the information is obtained from the MFD 120 and transmitted securely through the wireless device 140 to the CMS 180 as described above. The method then proceeds to step 540 where the wireless device 140 will determine whether the transmission was successful. If the transmission was not successful, as shown in step 550, the wireless device 140 will retry the transmission and/or provide a failure warning to the CMS 180. If the transmission is successful the method continues to step 560. In step 560, the information transmitted is updated in a persistence database of the CMS 180. The CMS 180 may determine whether the information transmitted is okay as shown in step 570. For example, the multifunctional device 120 is validated to determine whether the device 120 is part of the system 100, and is not a "wrong number;" the information transmitted is validated to determine the completeness of the transmission, the information is validated either through check digits testing the information fields, or by tests of information validity, such as "meter must be greater than last meter," "meter must be in a certain range," and "location has not changed." If the information is incorrect, an internal system at the CMS 180 is notified as shown in step 580. If the information transmitted appears correct, then the method proceeds to step 590 and the information is moved to an internal system at the CMS 180 for further processing.

Figure 6:
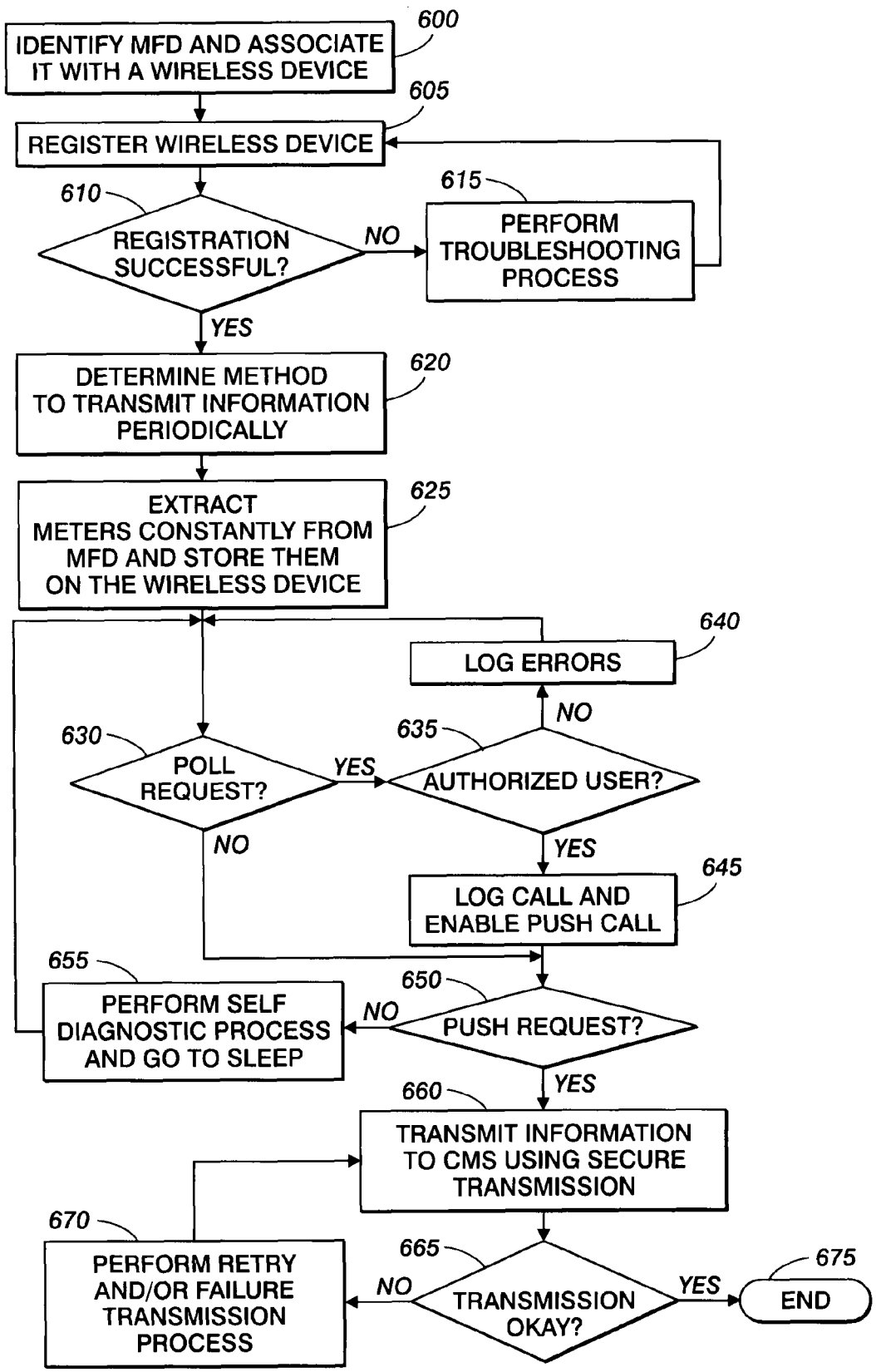
FIG. 6 is a flow diagram showing the detailed method steps of remotely obtaining information from a multifunctional device.

FIG. 6 is a flow diagram illustrating a method for remotely collecting information from the MFD 120. The method starts at step 600 and includes identifying the MFD 120 by associating it with a serial number and associating the wireless device (WD) 140 with the MFD 120. At step 605, the WD 140 is attached and installed and/or registered to the two-way communication channel 380 of the MFD 120, as described in FIG. 3. A user installing the WD 140 will make sure that the WD 140 is authenticated and that the install/registration is successful as shown in step 610. If the install is not successful, the method continues to step 615 and a troubleshooting process and/or an error message is initiated. Alternately, if the install is successful, the method continues to step 620 and a method for transmitting the information periodically is determined and added to the configuration setup. The MFD 120 is constantly looping based on a date/time and/or other algorithm to collect and transmit information. The MFD 120 may also use other criteria for transmitting information such as for example, every 10,000 meter counts, when the MFD 120 has a malfunction, and when the MFD 120 needs supplies. The MFD 120 is capable of initiating a transmission. In an embodiment the current meter count may be extracted bi-weekly from the MFD 120 and transmitted to the CMS 180 for processing. In an embodiment the current meter count may be extracted once a month from the MFD 120 and transmitted to the CMS 180 for processing. The MFD 120 is constantly monitoring (looping) meters and the WD 140 is capable of constantly extracting these meter counts from the MFD 120 and storing the meter counts in the flash memory module 280 of the WD 140 as shown in step 625.

Once the WD 140 stores the information in the flash memory module 280, the WD 140 determines whether there was a polled request for the information as shown in step 630. A polled request is enabled when any authorized and authenticated user from the CMS 180 issues a request for access to the information. If a polled request was not initiated, the method continues to step 650. Alternately, if the polled request was enabled, the method continues to step 635 and the authorization of the user is checked. If the user is not authenticated the method proceeds to step 640 and an error message and/or troubleshooting process is initiated. The WD 140 will then deny access to the information and log and store all invalid attempts into the flash memory module 280. If the user is authenticated and is allowed access to the information stored in the WD 140, the method continues to step 645 and a push request is enabled. The method then determines if a push request should be enabled as shown in step 650. Push requests are enabled in accordance with the transmission method and/or when a polled request is granted. If the push request is not enabled the method proceeds to step 655 and the WD 140 will perform an internal diagnostic and checking. Alternately, if the push request is enabled the method proceeds to step 660. The WD 140 will then transmit the requested information to the CMS 180 using the secure (HTTPS) data transmission as shown in step 660. At step 665 the WD 140 will check to make sure that the transmission was successful. If the transmission is not successful, then method proceeds to step 670 and the WD 140 will attempt to re-transmit at a programmed number of times. The WD 140 is also capable of logging the information when a transmission has failed. If the transmission is successful the method proceeds to step 675 and the method terminates.

Figure 7:
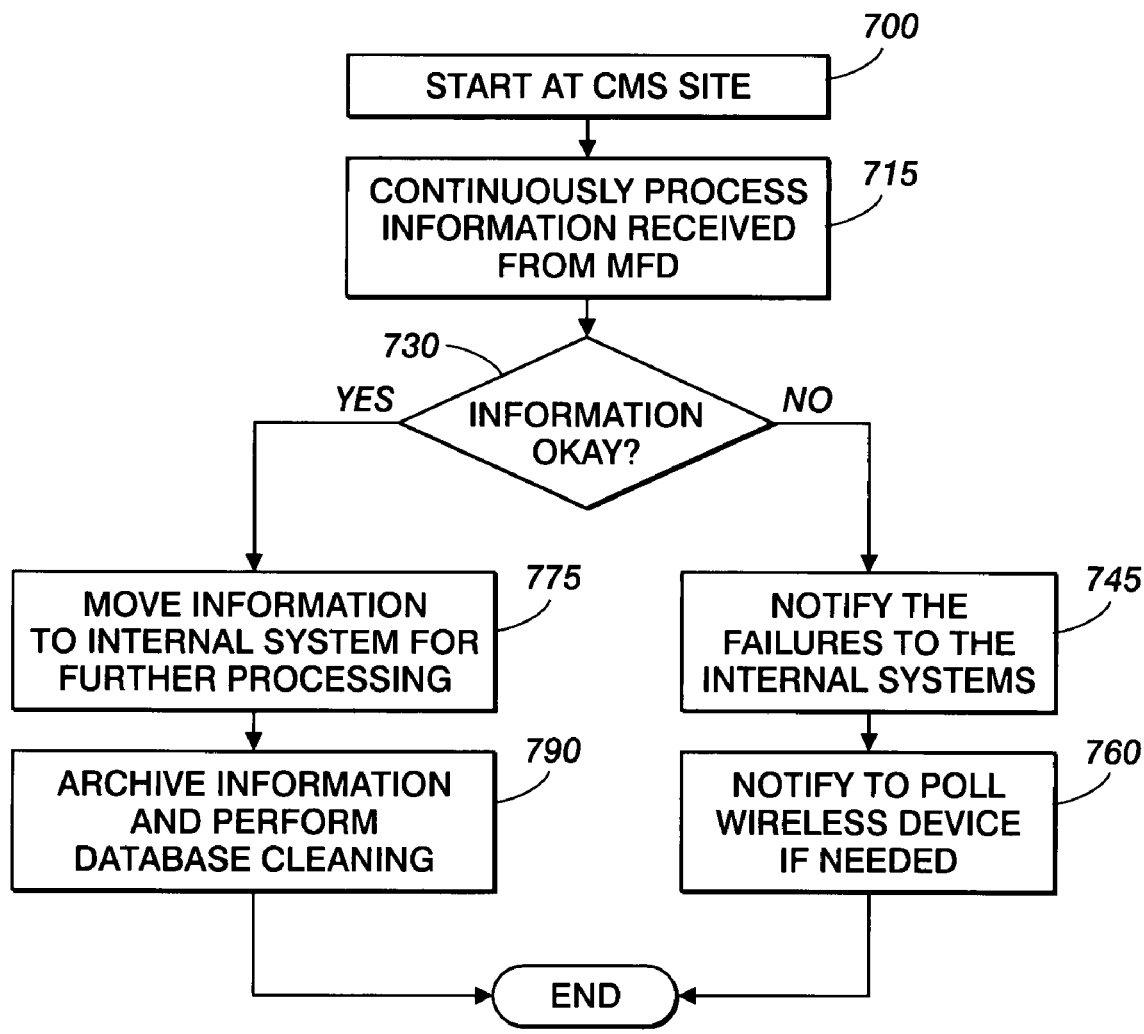
FIG. 7 is a flow diagram for the method of collecting information from a multifunctional device at a remote centralized management server location.

FIG. 7 is a flow diagram illustrating a method for continuously collecting and processing information from the remote MFD 120 at the centralized management server (CMS) 180 as shown at step 700. The CMS 180 software is constantly processing the information that it receives from the remote MFD 120 as shown in step 715. For purposes of being concise, the presently disclosed embodiments show an example of collecting information from a single MFD 120. Those skilled in the art will recognize that the method will work with many MFDs 120, from various remote locations. Each MFD 120 is associated with a serial number and a WD 140. In an embodiment, ten MFDs 120 are at a single location (for example, an office building) in one state, and twenty MFDs 120 are scattered at various locations throughout the country. Since each WD 140 associated with each MFD 120 contains a global positioning satellite (GPS) module, the location of each MFD can be determined and tracked.

At step 730 the CMS 180 will determine if the information transmitted is okay. If the information is not okay, the method proceeds to step 745 and the internal system at the CMS 180 will be notified of the problems. The problems will be logged and an analysis will be performed on the error and a poll request may be issued as shown in step 760. Alternately, if the information transmitted is okay the method proceeds to step 775 and the information received will be logged and moved to the internal system at the CMS 180 for further processing as shown in step 775. The information may be archived and the persistence database at the CMS 180 will be cleaned as shown in step 790.

There are certain practical advantages to using a commercially-available cell-phone or text-messaging service as the medium of communication. First, unlike land-line or even network-based systems, no particular hardware infrastructure need be installed, for instance, within a building to facilitate the communication. Second, each multifunctional device can be dedicated to in effect a single phone number, which stays with the transceiver no matter where the machine is transported, so that the transceiver can be associated with a phone number at the factory, said number remaining with the transceiver in effect for the life of the machine. Third, many commercial cell-phone systems include location-finding systems such as GPS, so that multifunction devices can be readily located for asset-management purposes.

All patents, patent applications, and published references cited herein are hereby incorporated by reference in their entirety. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for collecting information from a multifunctional device comprising:
   a multifunctional device; and
   a wireless device in operative communication with the multifunctional device,
   wherein the wireless device is configured to:
   collect information from the multifunctional device;
      process the collected information using application code;
      store the processed information;
      determine a satisfaction of a criterion within a set of criteria, the set of criteria comprising:
         a billing meter count of the multifunctional device crossing a pre-defined interval, and
         the wireless device receiving a request to transmit the processed information; and
      transmit the processed information in response to determining the satisfaction of at least one criterion within the set of criteria, wherein the wireless device transmits the processed information according to a time schedule, and wherein the wireless device further transmits, in addition to the time schedule, the processed information in response to receiving a polled request.

2. The system of claim 1 wherein the information is collected continuously and automatically based on a predetermined algorithm configured in the wireless device.

3. The system of claim 1 wherein the information is collected in response to a request initiated at a centralized management server.

4. The system of claim 1 wherein the information is collected in response to a request initiated at the multifunctional device.

5. The system of claim 1 wherein the collected information is processed using Java 2 Micro Edition.

6. A system for transmitting information between a multifunctional device and a centralized management server comprising:
   a multifunctional device;
   a wireless device in operative communication with the multifunctional device, the wireless device configured of:
      collecting a first set of information and a second set of information that is associated with the multifunctional device, the first set of information being collected prior to the second set of information; and
      using application code to process the first set of information and the second set of information and render the first set of information and the second set of information secure;
   a network in operative communication with the wireless device, wherein the wireless device transmits the first set of information and a second set of information securely over the network; and
   a centralized management server in operative communication with the network the centralized management server configured to:
      receive the first set of information and the second set of information transmitted by the wireless device; and
      validate the second set of information based upon a validity testing of a value within the second set of information relative to a value that is within the first set of information that corresponds to the value within the second set of information.

7. The system of claim 6 wherein the value within the first set of information and the value within the second set of information is a meter count.

8. The system of claim 6 wherein the wireless device comprises:
   a programmable microprocessor module;
   a wireless communication network module;
   an amount of persistent data storage; and
   a data cable connected to a two-way communication channel on the multifunctional device.

9. The system of claim 6 wherein the wireless device further comprises a global positioning satellite (GPS) module and wherein the value within the first set of information and the value within the second set of information comprise respective locations determined by the GPS module.

10. The system of claim 6 further comprising a communications controller which connects the centralized management server to the network.

11. The system of claim 6 wherein the wireless device transmits information securely over the network automatically based on a predetermined algorithm configured in the wireless device.

12. A method of transmitting information from a multifunctional device to a centralized management server, the method comprising:
   collecting information from a multifunctional device using a wireless device;
   securing, at the wireless device, the information using a secure functionality that is contained within the wireless device;
      determining a satisfaction of a criterion within a set of criteria, the set of criteria comprising:
         a billing meter count of the multifunctional device crossing a pre-defined interval, and
         the wireless device receiving a request to
      transmit the processed information; and
   and
   transmitting the secure information over a network to a centralized management server in response to determining the satisfaction of at least one criterion within the set of criteria, wherein the wireless device transmits the processed information according to a time schedule, and wherein the wireless device further transmits, in addition to the time schedule, the processed information in response to receiving a polled request.

13. The method of claim 12 wherein the collection of information from the multifunctional device occurs continuously and automatically based on a predetermined algorithm configured in the wireless device.

14. The method of claim 12 wherein the collection of information from the multifunctional device occurs in response to a request for information initiated at the centralized management server.

15. The method of claim 12 wherein the information is rendered secure using a communication protocol such as Hypertext Transfer Protocol over Secure Socket Layer (HTTPS).

16. The method of claim 12 wherein the centralized management server analyzes the information and moves the information to an internal system for further processing.

17. The method of claim 12 wherein the information collected is a meter count.

18. The method of claim 12 wherein the information includes a service code related to the multifunctional device.

19. The method of claim 18 wherein collecting of the service code initiates a service call related to the multifunctional device.

20. The system of claim 6, wherein the value within the first set of information that corresponds to the value within the second set of information comprises a first meter count of the multifunction device and the value within the second set of information comprises a second meter count of the multifunctional device; and wherein the centralized management server validates the second set of information based upon an increase in a value of the second meter count relative to a value of the first meter count.

21. The system of claim 9, wherein the value corresponding to the value that is within the first set of information comprises a first location of the multifunction device as determined by the GPS module, and the value within the second set of information comprises a second location of the multifunction device as determined by the GPS module after determining the first location; and wherein the centralized management server validates the second set of information based upon the second location being unchanged relative to a value of the first meter count.

* * * * *